United States Patent
Livny et al.

(10) Patent No.: US 11,756,404 B2
(45) Date of Patent: Sep. 12, 2023

(54) ADAPTIVE SEVERITY FUNCTIONS FOR ALERTS

(71) Applicant: Microsoft Technology Licensing, LLC, Redmond, WA (US)

(72) Inventors: Yotam Livny, Gadera (IL); Tamer Salman, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/378,219

(22) Filed: Apr. 8, 2019

(65) Prior Publication Data

US 2020/0320845 A1    Oct. 8, 2020

(51) Int. Cl.
| | |
|---|---|
| *G08B 21/00* | (2006.01) |
| *G08B 21/18* | (2006.01) |
| *G06N 20/00* | (2019.01) |
| *G06F 9/54* | (2006.01) |
| *G08B 5/22* | (2006.01) |

(52) U.S. Cl.
CPC .......... *G08B 21/182* (2013.01); *G06F 9/542* (2013.01); *G06N 20/00* (2019.01); *G08B 5/222* (2013.01)

(58) Field of Classification Search
CPC ...... G08B 21/182; G08B 5/222; G06N 20/00; G06F 9/542; G06F 21/566; H04W 12/60; H04L 63/1408
USPC ......................................................... 340/511
See application file for complete search history.

(56) References Cited

U.S. PATENT DOCUMENTS

| | | | |
|---|---|---|---|
| 8,948,793 B1* | 2/2015 | Birkhold | H04L 12/1895 455/445 |
| 2006/0179296 A1* | 8/2006 | Bartlett | H04L 63/0218 713/152 |
| 2011/0298614 A1* | 12/2011 | Bells | G06Q 10/109 340/539.13 |
| 2015/0242264 A1* | 8/2015 | Vibhor | G06Q 10/06 714/57 |
| 2015/0271124 A1* | 9/2015 | Atkins | G06F 11/0709 709/207 |
| 2018/0063166 A1 | 3/2018 | Warden et al. | |
| 2018/0181883 A1 | 6/2018 | Ikeda | |

OTHER PUBLICATIONS

"International Search Report and Written Opinion Issued in PCT Application No. PCT/US20/021294", dated May 26, 2020, 13 Pages.
Pietraszek, Tadeusz, "Using Adaptive Alert Classification to Reduce False Positives in Intrusion Detection", In Proceedings of the International Workshop on Recent Advances in Intrusion Detection, Sep. 15, 2004, 24 Pages.

* cited by examiner

*Primary Examiner* — Mark S Rushing
(74) *Attorney, Agent, or Firm* — Weaver IP L.L.C.

(57) ABSTRACT

Methods, systems and apparatuses are described herein to provide adaptive severity functions for alerts, particularly security alerts. The adaptive severity functions may be aligned with an existing global security situation to upgrade or downgrade the severity of new and existing alerts. By taking into consideration the time factor along with other parameters, the alerts may be prioritized or reprioritized appropriately. The modification of the severity level for the alerts may be made based on rules and/or one or more triggering events or by using severity functions with or without the aid of artificial intelligence based on best-practice preferences.

20 Claims, 6 Drawing Sheets

Apply the one or more environmental factors to a machine learning algorithm to generate the severity function, the one or more environmental factors comprising at least one of an alert confidence measure, a resource importance indicator, a time factor, an alert type, other alerts and information thereof, a similarity of alerts measure, user information, or a similarity of users measure — 702

Perform at least one of displaying the security alert and associated second severity level on a user interface, or notifying the user of the security alert and associated second severity level — 802

Provide explanatory information relating to a change from a first severity level to the second severity level of the security alert — 902

ADAPTIVE SEVERITY FUNCTIONS FOR ALERTS

BACKGROUND

There have been significant changes in recent years in the area of computer security. Attackers are now more sophisticated than ever and are interested in stealing important data and breaching networks to cause damage to device users and their computing devices. In response, consumers and organizations are being forced to employ improved security products to defend the users, their computing devices, and enterprise computing infrastructures from the attackers.

Security products are designed to protect computing assets such as computing devices, virtual machines, networks, applications, and/or data from unauthorized access. Security products may generate a high volume of low fidelity alerts, requiring a security administrator to perform triage and investigate. A typical administrator may receive an overwhelming number of security alerts, to the point where alert fatigue may occur. An administrator suffering from alert fatigue may become desensitized to the large number of frequent alerts and take longer to respond to alerts, not addressing alerts, or mishandling them.

Some solutions have been developed to mitigate alert fatigue and help manage alerts, such as prioritizing alerts based on alert types, aggregating alerts to increase their severity, grouping different alerts into compound higher severity incidents, or prioritizing alerts based on their true/false confidence. However, these measures may not be enough to effectively manage the high number of alerts that are generated for large, complex enterprise systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for adaptive severity functions for security alerts. A security alert associated with an entity is received. A first severity level associated with the security alert is determined. Data indicative of at least one environmental factor is received. Based on the received data, a second severity level associated with the security alert is generated. The security alert and the associated second severity level is provided to a user associated with the entity.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Note that the variable "N" is appended to various reference numerals identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. The examples described herein may be adapted to any type of targeted crawling system. Further structural and operational embodiments, including modifications/alterations, will become apparent to persons skilled in the relevant art(s) from the teachings herein.

In response to attacks on computing devices, consumers and organizations are being forced to employ security products to defend the users, their computing devices, and enterprise computing infrastructures from the attackers. Security products are designed to protect computing assets such as computing devices, virtual machines, networks, applications, and/or data from unauthorized access. Example security products may include malware or spyware protection products, cloud security, storage security, database security, identity and access management, backup and disaster recovery, email security, virtual private network and endpoint security, network security, web security, etc. Business organizations and consumers often rely on security products to provide protection against security threats for their computing infrastructure or personal computing devices.

Security products may generate a high volume of low fidelity alerts, requiring a security administrator to perform triage and investigate. A typical administrator may receive an overwhelming number of security alerts from multiple security products, that must be managed and resolved by the organization (e.g., by one or more engineers, customers, system administrators, maintenance professionals). The number of alerts may reach the point where alert fatigue may occur. An administrator suffering from alert fatigue may become desensitized to the large number of frequent alerts and take longer to respond to alerts, not addressing alerts, or mishandling them.

Some solutions have been developed to mitigate alert fatigue and help manage alerts, such as prioritizing alerts based on alert types, aggregating alerts to increase their severity, grouping different alerts into compound higher severity incidents, or prioritizing alerts based on their true/false confidence. However, these measures may not be enough to effectively manage the high number of alerts that are generated for large, complex enterprise systems.

Typically, once an alert and its associated severity is produced by a security product, the alert along with the severity remains constant until the alert is marked as handled or dismissed by an administrator. In many cases, however, alerts do not have the same level of relevance or severity as time passes. By not considering this time factor, investment of security personnel and resources may be inefficiently allocated or wasted. This improper investment may lead to inadequate handling of security risks or business damage.

Accordingly, embodiments overcome these issues by enabling adaptable alert relevance/severity values. For instance, in an embodiment, a way to help manage security alerts is to prioritize them by assigning a default severity value to them, such as high, medium or low, or aggregating and categorizing alerts as high importance or low importance, and subsequently modifying the assigned severity value based on one or more factors.

For instance, some security alerts may be less urgent than others, and unhandled security alerts may become irrelevant with time. In embodiments, by considering this time factor, optionally along with other parameters, such as alert type, alert default severity, and other existing alerts, an adaptive severity function may be determined to modify the severity of the security alert over time.

For example, when user credentials are stolen, a security alert may be generated with a default severity level of high severity. But, if the user credentials have been set to expire within 24 hours, then the severity level of the security alert may be adjusted to low (or silent) after the end of the 24-hour period. This is because the stolen credentials are no longer valid and therefore may not be considered a security threat after that time. As another example, when too many more important alerts are already displayed to a user, a new alert that is not as urgent compared to the existing alerts may have its default severity level be modified to improve triage. After the more urgent alerts have been resolved, the severity level of the new alert may be modified again to reflect its default severity level and/or its current severity level considering the existing global security situation.

Methods, systems and apparatuses are described herein to provide adaptive severity functions for alerts, particularly security alerts. The adaptive severity functions may be aligned with an existing "global security situation," which is a security situation corresponding to a given set of computing devices, such as a particular computing infrastructure (e.g., a cloud network, a data center, etc.) or a particular organization, to upgrade or downgrade the severity of new and existing alerts. By taking into consideration the time factor along with other parameters, the alerts may be prioritized or reprioritized appropriately. The modification of the severity level for the alerts may be made based on rules and/or one or more triggering events or by using a severity function for alerts with or without the aid of artificial intelligence based on best-practice preferences.

Accordingly, adaptive severity functions allow for an improved user experience by making the task of managing alerts become much less burdensome. Adaptive severity functions reflect the current security situation while accounting for existing alerts, enabling the user to easily and confidently handle the accurately prioritized alerts. By improving the alert management process, the functioning of the computing systems and devices on which the alert management process is being executed is also substantially improved, for example, the improvement from a computing resource perspective may be efficiency. In other words, fewer computing resources (e.g., processor cycles, input/output, power) may be required to manage security alerts because the management of security alerts is more precise and efficient with the adaptive severity functions. Moreover, the security alerts may be displayed to a user, for example, on a user interface (UI). Accordingly, the UI may be improved with the adaptive severity functions because the security alerts along with the associated severity levels, with optional explanatory information, may all be displayed on the UI. Furthermore, in embodiments, artificial intelligence may be used to learn the proper influence of different features, such as resource importance, alert types, user information, existing alerts, time factor, similarity of alerts, similarity of users or consumers. For example, a machine learning algorithm may be used to generate the severity functions based on the different features.

Figure 1:
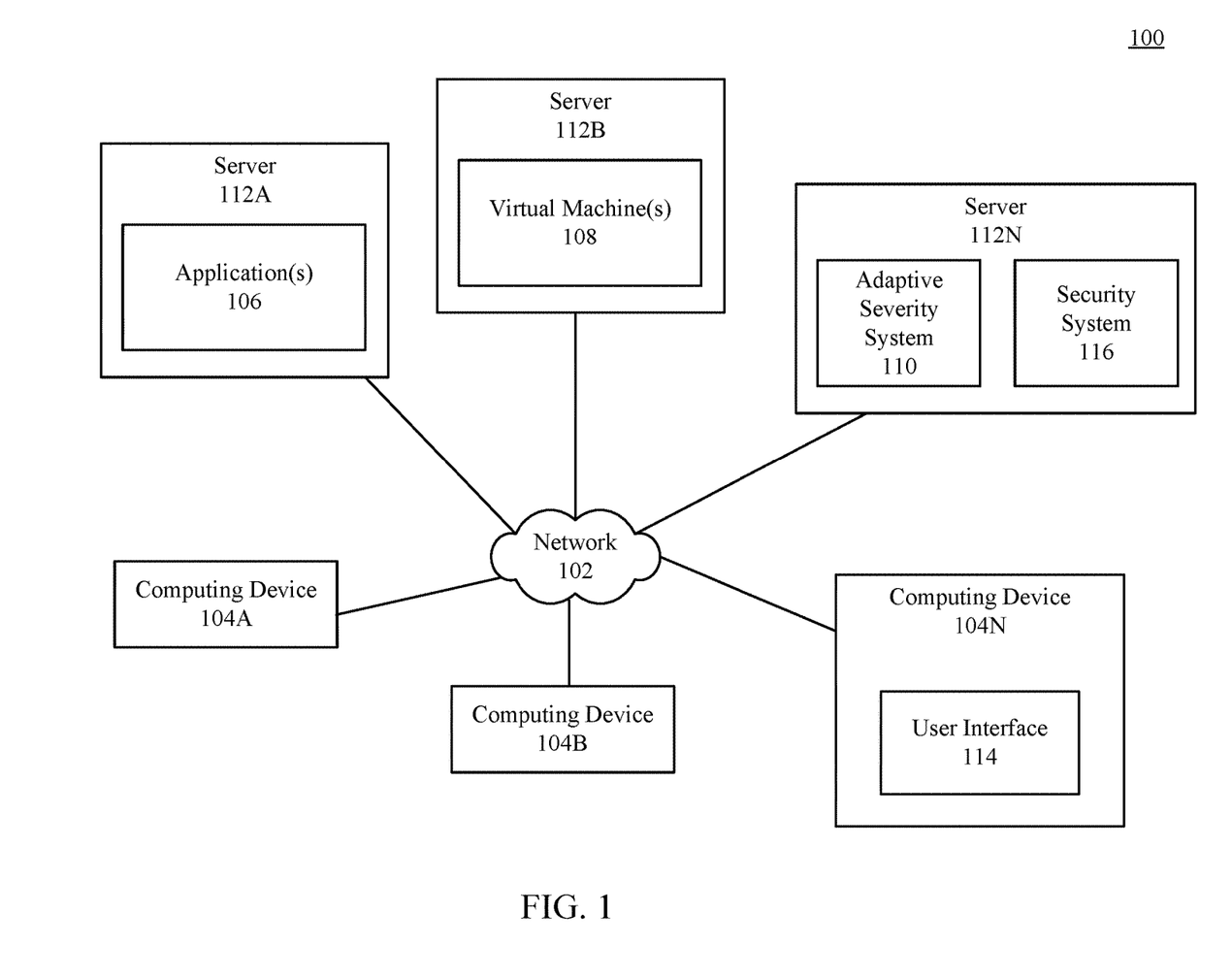
FIG. 1 is a block diagram of a system configured to enable adaptive severity for alerts, according to an embodiment.

Management of security alerts that includes adaptive severity functions may be enabled in various ways in embodiments. For instance, FIG. 1 is a block diagram of a system 100 configured for adaptive severity for alerts, according to an example embodiment. As shown in FIG. 1, system 100 includes one or more computing devices 104A-104N and one or more servers 112A-112N communicatively coupled via a network 102. Server 112A includes one or more applications 106, server 112B includes one or more virtual machines 108, and server 112N includes an adaptive severity system 110 and a security system 116. System 100 is described in further detail as follows.

Network 102 may comprise one or more networks such as local area networks (LANs), wide area networks (WANs), enterprise networks, the Internet, etc., and may include one or more of wired and/or wireless portions. In an embodiment, computing devices 104A-104N and servers 112A-112N may communicate over network 102 via one or more application programming interfaces (API), or in any other manner.

Computing devices 104A-104N include the computing devices of users (e.g., individual users, family users, enterprise users, governmental users, etc.) that may access network-accessible resources such as servers 112A-112N over network 102. System 100 may include fewer or more computing devices than depicted in FIG. 1. Computing devices 104A-104N may each be any type of stationary or mobile computing device, including a mobile computer or mobile computing device (e.g., a Microsoft® Surface® device, a Google™ Chromebook™, an Apple® MacBook®, a personal digital assistant (PDA), a laptop computer, a notebook computer, a tablet computer such as an Apple® iPad™, a netbook, etc.), a smartphone, a mobile phone, a wearable computing device, or other type of mobile device, or a stationary computing device such as a desktop computer or PC (personal computer), or a server. Each of computing devices 104A-104N is configured to store data and execute one or more computer programs, applications and/or services. For example, computing device 104N may include user interface 114 for an application or service that is configured to provide information to a user of computing device 104N. A user of computing device 104N may enter input via user interface 114 or otherwise interact with user interface 114.

Servers 112A-112N and any additional resources may define a network accessible server infrastructure. In example embodiments, servers 112A-112N may form a network-accessible server set, such as a cloud computing server network. For example, servers 112A-112N may comprise a group or collection of servers (e.g., computing devices) that are each accessible by a network such as the Internet (e.g., in a "cloud-based" embodiment) to store, manage, and process data. System 100 may include any number of servers, fewer or more than the number of servers 112A-112N shown in FIG. 1. While not shown, system 100 may include additional resources that facilitate communications with and between the servers (e.g., network switches, networks, etc.), storage by the servers (e.g., storage devices), resources that manage other resources (e.g., hypervisors that manage virtual machines to present a virtual operating platform for tenants of system 100, etc.), and/or further types of resources. Servers 112A-112N may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers 112A-112N may be co-located (e.g., housed in one or more nearby buildings with associated components such as backup power supplies, redundant data communications, environmental controls, etc.) to form a datacenter, or may be arranged in other manners. In accordance with this embodiment, servers 112A-112N may be configured to service a particular geographic region. For example, one or more servers 112A-112N may be configured to service the northeastern region of the United States, and other servers may be configured to service the southwestern region of the United States. Servers 112A-112N may service any number of geographical regions worldwide.

Each of servers 112A-112N may be configured to execute one or more services (including microservices), applications, and/or supporting services. A "supporting service" may be a cloud computing service/application configured to manage a set of servers (e.g., a cluster of servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of servers 112A-112N may be configured to execute any number of services, including multiple instances of the same and/or different supporting services. As a non-limiting example, server 112A may include one or more applications 106, server 112B may include one or more virtual machines 108, and server 112N may include an adaptive severity system 110 and a security system 116. Adaptive severity system 110 is configured to adapt severity for security alerts for system 100. In embodiments, adaptive severity system 110 may also be implemented as part of security system 116. Though adaptive severity system 110 is shown in FIG. 1 as being included in server 112N, in an embodiment, adaptive severity system 110 may be included in more nodes of servers 112A-112N other than server 112N, and there may be multiple instances of adaptive severity system 110. In addition, adaptive severity system 110 and security system 116 may be on different servers.

In example embodiments, security system 116 may be configured to collect, analyze, and integrate log data from resources of system 100, such as network 102 and firewall and endpoint protection solutions, to detect security threats. Security system 116 may analyze, for example, by correlating information from multiple sources, to identify security threats. Security system 116 may utilize security analytics such as integrated threat intelligence to look for known bad actors by leveraging global threat intelligence across multiple products and services, behavioral analytics to apply known patterns to discover malicious behavior, and anomaly detection to build a historical baseline based on statistical profiling and to provide alerts of deviations from the baseline that indicate potential attacks.

Security system 116 may be configured to generate security alerts in response to detected threats. A security alert may include details such as description, count, source, date, time, state, and severity. A description may be an explanation of the alert. A count may be a list of all alerts for this specific type that were detected during a particular time frame. A date may be a date that the event occurred. A state describes a current state for an alert, for example, "active" or "open" for a security incident that is on-going and "dismissed" or "resolved" for an alert that has been resolved or determined not to be an attack. A severity indicates a default severity level, such as high, medium or low or a numerical range (e.g., 0-4). A security alert may be an informational alert that may not require attention but may present useful information in the context of other alerts. A security alert may include suggested remediation steps that a user may take.

Accordingly, a security alert may include information about what triggered the alert, the resources targeted, and the source of the attack. There may be multiple alert types, which may depend on the analytics used to generate the alert. Non-limiting examples of analytics may include virtual machine behavioral analysis (e.g., event analysis, crash analysis), network analysis, and database and data warehouse analysis. In addition, contextual information may be provided. During an investigation, a security administrator may want contextual information to make a decision about the nature of a threat and how to mitigate it. Contextual information may provide artifacts, related events or other information to help the security administrator in this aspect.

Security alerts generated by security system 116 may be saved in one or more repositories and provided to a user by a posting on a UI, for example, user interface 114, or in an application. Additionally or alternatively, the security alerts may be sent to a recipient, which may be a receiving means for a user such as a computing device, a phone number, an email address associated with a corresponding email tool or repository, a text messaging number associated with a corresponding email tool or repository, a text messaging number associated with a corresponding text message repository, an instant messaging address associated with a corresponding an instant messaging repository, etc.

Adaptive severity system 110 may be configured to adapt the severity of alerts that are produced by security system 116. Adaptive severity system 110 may be configured to take as input, a new or existing security alert, for example, saved by security system 116 in the one or more repositories. Each alert may include a default severity derived from several factors, such as true/false confidence, a correlation of a number of alerts to create a fusion, resource importance, etc. Each alert may optionally include or reference a severity function template. When the severity function template is available, the influence of or portion of or all existing alerts on the severity function template may be computed to generate a severity function aligned to the existing global security situation. Artificial intelligence may be used to determine the proper influence of the existing alerts, among other features (e.g., resource importance, alert types, user information), on the severity function template and adjust the severity function. If the alert is not a new alert, based on time passed since the alert was generated, the severity may be updated using the severity function. The updated severity and the alert may be displayed in a user interface, such as user interface 114 of computing device 104N, optionally with insights on why the severity was updated, such as time passed, influenced by other alerts, true/false confidence, etc.

Figure 2:
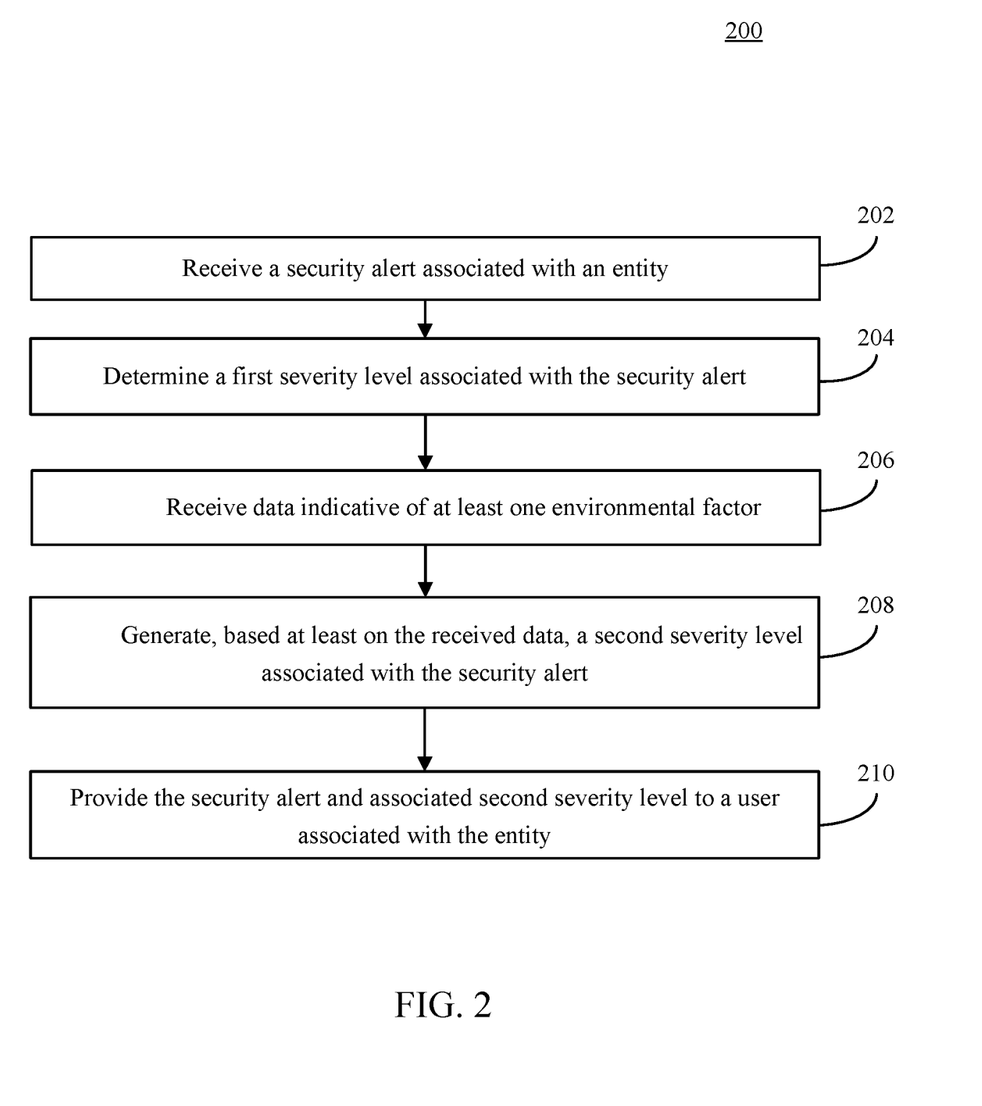
FIG. 2 is a flowchart of a method for adaptive severity for security alerts, according to an embodiment.

Further aspects of system 100 of FIG. 1 will now be discussed in conjunction with FIG. 2 which depicts a flowchart 200 of an example method for adapting severity of security alerts, according to an embodiment. Although described with reference to system 100 of FIG. 1, the method of FIG. 2 is not limited to that implementation. Other structural and operational embodiments will be apparent to persons skilled in the relevant art(s) based on the following discussion regarding flowchart 200 of FIG. 2.

Flowchart 200 begins at step 202. At step 202, a security alert associated with an entity is received. For example, and with reference to system 100 of FIG. 1, adaptive severity system 110, as discussed above, may receive a security alert associated with an entity from a repository such as a database. The security alert may be generated by security system 116 and saved in the repository for retrieval by adaptive severity system 110, or adaptive severity system 110 may receive the security alert as soon as it is generated. The security alert may be a single alert, or a compound or fusion alert that includes several alerts that are correlated to a single security incident or issue. The security alert may be related to any aspect of system 100 such as servers 112A-112N and their resources, for example, cloud security, storage security, database security, identity and access management, backup and disaster recovery, email security, virtual private network and endpoint security, network security, web security, etc. In an embodiment, the entity with which the security alert is associated may be any of a user machine or device, a virtual machine, a network, an application or service, or data.

Flowchart 200 of FIG. 2 continues at step 204. At step 204, a first severity level associated with the security alert is determined. For example, adaptive severity system 110 shown in FIG. 1 may determine the first severity level associated with the security alert. In an embodiment, the first severity level may be a default severity level that is determined by security system 116 and/or other computer program logic and saved along with the security alert in the repository. The default severity level may be hard coded. In another embodiment, the first severity level may be a default severity level that is determined by adaptive severity system 110 based on information such alert confidence, resource importance, and other alerts and information thereof. The alert confidence of a security alert is a true/false measure of how confident or certain the system is about a security incident, such as whether a data breach or intrusion occurred. For example, an 80% T/F confidence measure for a security alert may result in a severity of low, whereas a 100% T/F confidence measure may result in a severity of high. The resource importance indicator provides information about the relative importance of a resource for a user or organization. For example, a database that contains private, confidential information may be considered highly important, but a database that does not have private information may be considered not important or of low importance. As another example, a server that houses a web application for a customer may be considered important, whereas a server that is merely being rented out for testing may be considered not important. Other alerts may also factor into the default severity of the security alert as more data may present a fuller picture regarding a security situation. For example, if multiple alerts are correlated to a single security incident, the multiple alerts may be aggregated to create a fusion alert or a compound alert. The severity level of a compound alert may be an average severity level, a highest or lowest severity level, or any other suitable calculation of the severity level for the grouping of alerts that forms the compound alert.

In step 206, data indicative of at least one environmental factor is received. For example, adaptive severity system 110 may be configured to receive data indicative of at least one environmental factor, in an embodiment. For example, environmental factors may be any factor that influences the severity of a security alert, such an alert confidence measure, a resource importance indicator, a time factor, an alert type, other alerts and information thereof, a similarity of alerts measure, user information, or a similarity of users measure. Examples of environmental factors are described in more detail in connection with FIG. 3.

In step 208, based at least on the received data, a second severity level associated with the security alert is generated. For example, adaptive severity system 110 may be configured to generate, based at least on the received data, a second severity level associated with the security alert. In an embodiment, as more data is received about the same or different environmental factors, the severity level for a security may be updated. The environmental factors may change with time as the global security situation changes. For example, if a security incident involves user credentials being stolen, then the security alert for that incident may have a default severity of high. However, if the user credentials have been set to expire within 2 days, adaptive severity system 110 may be configured to receive this time factor data. Then, based on the time factor data, adaptive severity system 110 may be configured to modify the default severity to medium severity after 2 days. However, if at that point data about other existing alerts are received indicating that there are more urgent alerts than the stolen credentials alert, then adaptive severity system 110 may be configured to again update the medium severity to low severity to improve triage. As time passes and if the more urgent alerts have been resolved, the stolen credential alert may be upgraded back to medium severity or any other appropriate severity level given the security situation for system 100 at that time.

Flowchart 200 of FIG. 2 concludes at step 210. In step 210, the security alert and associated second severity level is provided to a user associated with the entity. For example, adaptive severity system 110 may be configured to provide the security alert and associated second severity level to a user associated with the entity. As discussed above, the alert may have various forms, such as a telephone call, a text message, an email message, a message posted on a web UI or in an application. In embodiments, one or more forms may be used to provide notification to the user of the security alert. For example, the security alert may be posted on a web UI or in an application and an email and/or text message may be sent to the user. The user may configure rules or preferences regarding alert notification, such has how often should alerts be sent, which type of alerts should be sent through the different channels, or through which means the alerts should be provided.

In the foregoing discussion of steps 202-210 of flowchart 200, it should be understood that at times, such steps may be performed in a different order or even contemporaneously with other steps. Moreover, each step of flowchart 200 may be performed, for example, by adaptive severity system 110 of FIG. 1. Note also that the foregoing general description of the operation of system 100 and flowchart 200 is provided for illustration only, and embodiments of system 100 may comprise different hardware and/or software and may operate in manners different than described above.

Figure 3:
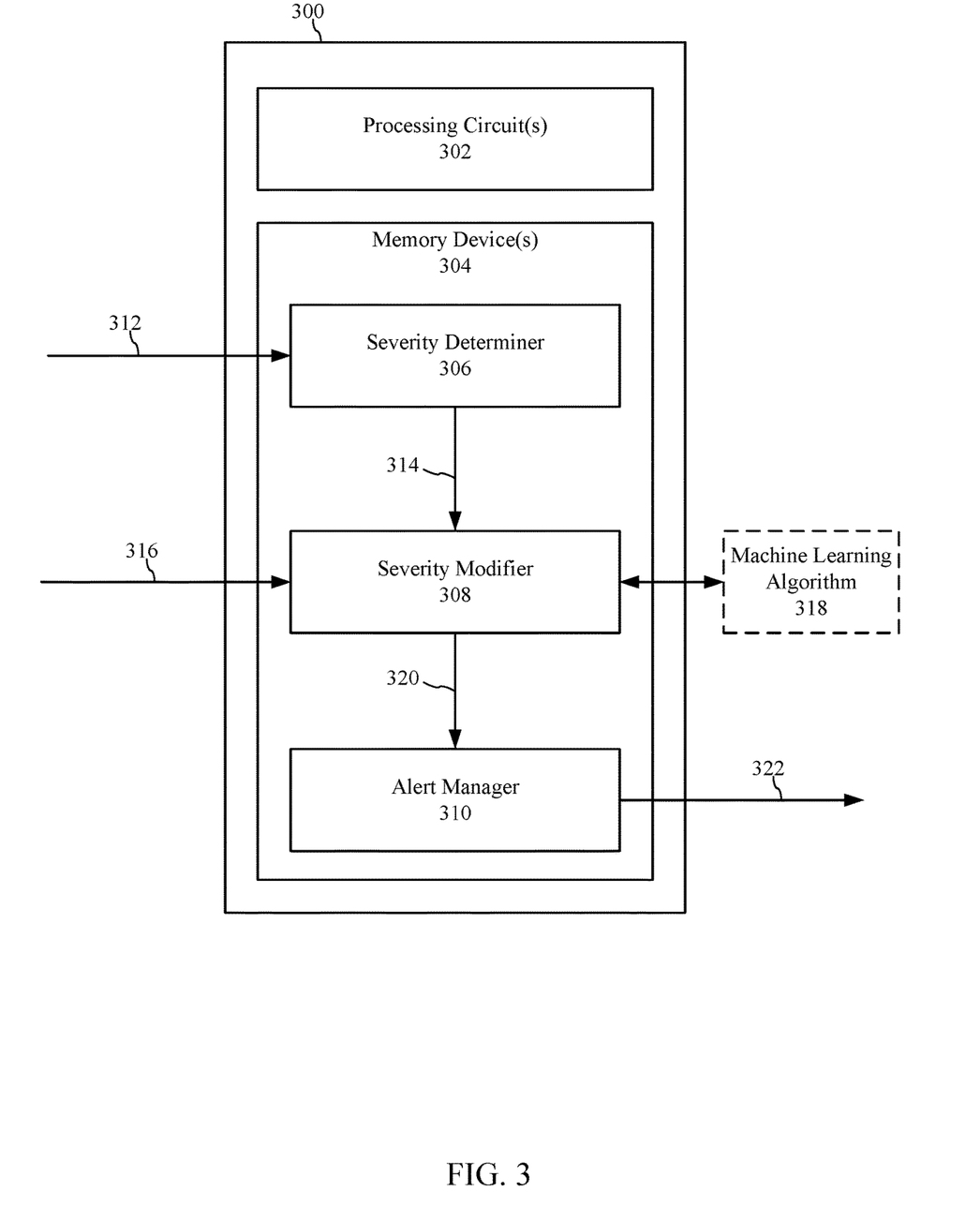
FIG. 3 is a block diagram of an adaptive alert severity system for security alerts, according to an example embodiment.

Adaptive severity system 110 may be implemented in various ways to perform its functions. For example, FIG. 3 is a block diagram of an adaptive severity system 300 for security alerts, according to an example embodiment. Adaptive severity system 300 is an example embodiment of adaptive severity system 110 and/or may be implemented in a security system, such as security system 116 of FIG. 1. As shown in FIG. 3, adaptive severity system comprises one or more processing circuits 302 and one or more memory devices 304.

Processing circuits 302 may include one or more microprocessors, each of which may include one or more central processing units (CPUs) or microprocessor cores. Processing circuits 302 may also include a microcontroller, application-specific integrated circuit (ASIC), and/or field-programmable gate array (FPGA). Processing circuit(s) 302 may operate in a well-known manner to execute computer programs (also referred to herein as computer program logic). The execution of such computer program logic may cause processing circuit(s) 302 to perform operations, including operations that will be described herein. Each component of system 300, such as memory devices 304 may be connected to processing circuits 302 via one or more suitable interfaces.

Memory devices 304 include one or more volatile and/or non-volatile memory devices. Memory devices 304 store a number of software components (also referred to as computer programs), including severity determiner 306, severity modifier 308, and alert manager 310, that can be executed by processing circuits 302. Memory devices 304 may also store other software components, such as an operating system and one or more applications. The features of FIG. 3 are further described as follows.

Severity determiner 306 of adaptive severity system 300 is configured to receive at least one security alert 312. Security alert 312 may be any alert generated by a security system, such as security system 116 of FIG. 1. For example, security alert 312 may be a single alert, an informational alert, or a fusion alert that is an aggregation of several alerts that have been correlated to a single event or related events. Security alert 312 may be associated with any entity or resource within a system, such as system 100 shown in FIG. 1. For example, the entity may include a user machine, a virtual machine, a network, an application or data. Security alert 312 may include information such as a description, count, source, date, time, state and default severity as discussed above. Security alert 312 may be of any type, for example, based on the analytics used to issue security alert 312, such as virtual machine behavioral analysis, network analysis, database and data warehouse analysis. Security alert 312 may be received from one or more repositories that may be on the same or different machine as adaptive severity system 300.

Severity determiner 306 is configured to determine a default severity of security alert 312 in an example embodiment. Severity determiner 306 may be configured to determine the default severity based on factors such as T/F confidence, other alerts, resource importance, etc. The default severity may include different levels, such as high, medium or low or a numerical range (e.g., 0-4). For example, a high severity may indicate a high probability that a resource is compromised and that there is high confidence in malicious intent and in the data used to issue the alert. As another example, a medium severity may correspond to a suspicious activity that indicates that a resource is compromised and that there is medium confidence in malicious intent and in the findings or analytics used to issue the alert. As yet another example, a low severity may be indicative of a benign or blocked attack, that there is low confidence in malicious intent, or the detected activity may be innocent. For example, an alert about a server set that is solely used for testing for a business may be assigned a low level of severity, whereas an alert about a server set that hosts an important application for that business may be assigned a high level of severity. In an example embodiment, the default severity of security alert 312 may be determined by another system, such as security system 116, and saved along with security alert 312 to be received by severity determiner 306. In other words, security alert 312 may include a word or number that is indicative of the default severity. Severity determiner 306 is configured to send security alert 312 along with the default severity as data 314 to severity modifier 308.

Severity modifier 308 is configured to receive data 314 from severity determiner 306 as well as one or more environmental factors 316 from one or more sources. For example, environmental factors may be any factor that may influence the severity of a security alert, such an alert confidence measure, a resource importance indicator, a time factor, an alert type, other alerts and information thereof, a similarity of alerts measure, user information, or a similarity of users measure. The alert confidence of a security alert is a true/false measure of how confident or certain the system is about a security incident, such as whether a data breach or intrusion occurred. The resource importance indicator provides information about the relative importance of a resource for a user or organization. A time factor may be the time at which security alert 312 was produced. An alert type depends on the analytics used to generate security alert 312, for example, machine behavioral analysis (e.g., event analysis, crash analysis), network analysis, database and data warehouse analysis. Other alerts include existing alerts for a given incident or about a system, such as system 100 shown in FIG. 1. Information about other alerts include contextual information or related information that may be helpful to correlate the existing alerts to security alert 312. The similarity of alerts measure may indicate whether security alert 312 is similar and/or how similar to any alert, open or resolved. User information may be information about a user (e.g., an organization or consumer). The similarity of users measure may indicate whether the user (e.g., organization) for which security alert 312 is generated is similar and/or how similar to other users in a particular resource group or across an organization, for example.

Other information may be received by severity modifier 308 to aid with the process of adapting severity for security alerts, for example, the number of alerts of the same alert type that are open in subscription (e.g., a grouping of resources), the number of alerts of the same alert type that have been resolved in subscription, the average time to resolve or dismiss the number of alerts of the same alert type, the similarity of one or more entities related to a particular alert to other entities in subscription, the percentage of true alerts of the same alert type in the past, the importance of a resource or entity that generated the security alert, the number of other alerts that are correlated with the entity, the number of other alerts that are correlated with the security alert having the same type, the changes in the configuration and/or applications of the entity before the time the security alert was generated, the changes in configurations and/or applications of the entity after the time the security alert was generated, the geolocation and time in the geolocation of the entity, etc.

Severity modifier 308 is configured to modify the default severity of security alert 312 to align with the current global security situation, which may change within hours or days. For example, a detection of a brute force attack on a machine may generate an alert having a particular severity level. As time passes, the machine appears to be functioning strangely—deviating from the norm (e.g., abnormally high processor utilization, abnormally high storage access rates, etc.). At this time, it becomes more clear that the attack might still be on-going, and therefore the alert, as well as other alerts connected to this attack, may be upgraded to a higher severity level. As another example, a developer might find a vulnerability in code that is being developed and may mark the code with a low severity level. However, as the code development progresses closer to the production stage, the low severity level may be upgraded to a higher severity level as the vulnerability is more of a threat in the production stage than in the development stage.

Severity modifier 308 may modify the default severity in several ways. For example, severity modifier 308 may modify the default severity of security alert 312 by using severity function templates and severity functions for alerts. A severity function template may provide a function (e.g., an equation, a relationship, etc.) that explains how the severity for a security alert might change, from which severity level to which level, when does the severity level change, or what is the rate of change of the severity. For example, severity modifier 308 may select a severity function template from multiple severity function templates based on a type of the security alert, and the type may be based on the analytics used to generate the security alert, such as virtual machine behavioral analysis, network analysis, and database and data warehouse analysis. Other types, factors and criteria may be used to select the severity function template. For example, a generic severity function template for all alerts may be selected for all alert types. As another example, multiple severity function templates, each corresponding to an alert type, may be generated and selected by severity modifier 308. A new severity function template may be generated by modifying an old severity function template, for example. In an example embodiment, the generation and/or selection of the severity function template may be performed by a security system, such as security system 116 of FIG. 1, at the time of generation of a security alert.

Severity modifier 308 is further configured to generate a severity function based on the severity function template and one or more environmental factors 316 related to a security situation and to associate the severity function with security alert 312. Severity modifier 308 is also configured to generate a modified severity level based on the received data applied as input to the severity function, the received data being related to one or more environmental factors 316.

Below is a non-limiting example of a function template and associated severity function.

```
FunctionTemplate (<alertType>, <timeAlertGenerated>, <alertEntities>, . . . )
{
  v_1 = # <alertType> open in subscription
  v_2 = # <alertType> resolved in subscription
  v_3 = # <alertType> average time to resolve/dismiss
  v_5 = similarity in alert's entities to other entities in subscription
  v_6 = % of true <alertType> in the past
  v_7 = <alertEntities> importance
```

```
v_8 = # of other alerts correlated with <alertEntities>
v_9 = # of other alerts correlated with <alertType>
v_10 = changes in <alertEntities> configurations & applications before
<timeAlertGenerated>
v_11 = changes in <alertEntities> configurations & applications after <timeAlertGenerated>
v_12 = <alertEntities> geoLocation & time in geolocation
v_13 = ...
...
V_n = ...
outSeverity = Function(<alertType>, <alertDefaultSeverity>, v_1, v_2, ..., v_n,
<currentTime>)
}
```

In the above, the FunctionTemplate is merely one example of a severity function template, and there can be many other instances, depending on the alert type and data available for input, such as the time the security alert was generated, the source(s) of the security alert, etc. Such a function template may be configured to combine the input factors/parameters/features (e.g., v_1, v_2, etc.) in any predetermined manner, including using addition, subtraction, multiplication, division, scaling, true-false logic, etc., and may include or use the input parameters as values for variable, for coefficients, etc. Depending on collected information, such as environmental factors 316, the Function may be generated from the FunctionTemplate and associated with a particular security alert, such as security alert 312 shown in FIG. 3. The collected information or features may include a time factor and other features that may not be related to time but can help to generate a function that explains how time affects the severity of a security alert having a particular alert type. Non-limiting examples of the features may be environmental factors as discussed above, particularly the number of alerts of the same alert type that are open in subscription (e.g., a grouping of resources), the number of alerts of the same alert type that have been resolved in subscription, the average time to resolve or dismiss the number of alerts of the same alert type, the similarity of one or more entities related to a particular alert to other entities in subscription, the percentage of true alerts of the same alert type in the past, the importance of a resource or entity that generated the security alert, the number of other alerts that are correlated with the entity, the number of other alerts that are correlated with the security alert having the same type, the changes in the configuration and/or applications of the entity before the time the security alert was generated, the changes in configurations and/or applications of the entity after the time the security alert was generated, the geolocation and time in the geolocation of the entity, etc.

According to the above example, the generated severity function (e.g., Function) may take any number of the above factors as input along with the alert type, the default severity for security alert 312, and a current time to output a modified severity for the security alert 312.

In example embodiments, severity modifier 308 may employ a machine learning algorithm 318 to learn the proper influence of the different features on the severity of a security alert. For example, machine learning algorithm 318 may accept training data from multiple sources as input and use such training data to obtain or update a severity function. Training data may include system on chip inputs, user feedback on true positive/false positive from one or more user; security trends, posts, blogs, new vulnerabilities and other findings in media, time and likelihood for other correlated alerts to be issued after a given security alert is generated; best practices and known security rules (e.g., password expiration time), environmental factors, etc. As more training data is incorporated by machine learning algorithm 318, the trained severity function may become more sophisticated and accurate in its prediction of severity over time. For example, if machine learning algorithm 318 learns that a feature is highly relevant in determining severity, it may increase a weight associated with that feature in the severity function. Once a high degree of confidence of the severity function is reached, that severity function may be deployed for wider use. For example, that severity function may be deployed to adaptive severity system 300 and used by severity modifier 308 to modify the severity of security alert 312 based on the received environmental factors 316. As more training data is collected, machine learning algorithm 318 may continue to update the severity function as needed.

Accordingly, if a security alert 312 has a severity function template then a severity function may be generated from the severity function template, and the default severity of security alert 312 may be modified with the passage of time as discussed above. However, if there is no severity function template saved with security alert 312, then severity modifier 308 may be configured to modify the default severity of security alert 312 based on rules and/or one or more triggering events, such a new alert being generated, information about the security alert, or a time factor. The rules may be configurable by severity modifier 308 or a user. For example, a high severity security alert may be generated for stolen credentials, which are set to expire within 24 hours. After the 24 hours period has passed, the security alert may be downgraded to low severity. The triggering event for the severity modification here is the passage of time. In an example embodiment, severity modifier 308 may continuously monitor the existing alerts and their associated environments for triggering events that may cause a severity of one or more security alerts to be modified. In another embodiment, severity modifier 308 may periodically check the existing alerts rather than monitor continuously.

Severity modifier 308 may be configured to save security alert 312 along with the modified severity level to the repository from which security alert 312 was retrieved or to a different repository. Severity modifier 308 may also save contextual information or any new findings related to security alert 312.

Severity modifier 308 may be configured to automatically dismiss security alert 312 if it is no longer relevant, for example, a predefined time has passed, a measure of confidence for security alert 312 significantly decreases, etc. In an embodiment, the dismissal of irrelevant security alert may be a manually set severity function.

In example embodiments, severity modifier 308 may be further configured to output the modified severity and the security alert as data 320 to alert manager 310. Data 320 may further include contextual information, or any other information related to security alert 312 and its modified severity. For example, data 320 may include explanatory information relating to a change from the default severity level to the modified severity level of security alert 312. As non-limiting examples, explanatory information may inform a user that the change in severity is due to the fact that a predefined time has passed, based on influence of other alerts, or based on a change in the T/F confidence measure.

Alert manager 310 is configured to receive data 320 from severity modifier 308. Alert manager 310 is further configured to manage security alert 312 by assembling and/or generating a notification 322 that may include at least security alert 312 and its updated severity level. Notification 322 may optionally include contextual information or explanatory information relating to the change from the default severity level to the modified severity level of security alert 312. In an embodiment, notification 322 may include information about a single security alert, such as security alert 312. In another embodiment, notification 322 may include additional information about other correlated alerts to form a fusion or compound alert. The severity level of a compound alert may be an average severity level, a highest or lowest severity level, or any other suitable calculation of the severity level for the grouping of alerts that forms the compound alert. Notification 322 may be provided to a user through one or more means, such as displaying notification 322 on an application or a user interface, for example, user interface 114 shown in FIG. 1. As an example, notification 322 may be displayed on a web UI of a security product such that the user may view notification 322 the next time the user logs into the security product. Notification 322 may additionally or optionally be sent to the user directly, such as via email, telephone—as a voice call or a text message, or an instant messaging platform. In example embodiments, notification 322 may be provided to the user via one or more API calls.

Security alert 312 shown in FIG. 3 is described herein as having a default severity level that is updated to a modified severity level. In example embodiments, the severity level of a security alert may be modified multiple times as the need arises with the passage of time. Thus, the security alert received by adaptive severity system 300 may be associated with any severity level, not necessarily the severity level that was originally assigned at issuance of the security alert. For example, a security alert may be received with a first severity level. Based on the first severity level and other existing parameters at a given time, T1, a second severity level may be determined and assigned to the security alert by severity determiner. Then, at a later time, T2, based on time passed and other parameters, such as newer alerts generated after T1, a third severity level may be generated for the security alert, for example by severity modifier 308. The first severity level may be different from the second severity level, and the third severity level may be different from the second severity level. However, depending on the security situation and/or the received parameter(s) when the severity is updated, the first severity level may be different from or the same as the third severity level. Thus, a severity level for a security alert may be updated based at least on a time factor (such as a lapse of time, a predefined time period, etc.) and/or other parameters any number of times until it is resolved and/or dismissed.

FIGS. 4-9 depict flowcharts 400-900 as additional example methods in the process of adapting a severity of a security alert, according to embodiments, and wherein flowcharts 400-900 comprise refinements or additions to the method steps of flowchart 200 as depicted in FIG. 2. Accordingly, flowcharts 400-900 will also be described with continued reference to adaptive severity system 110 of FIG. 1 and/or adaptive severity system 300 of FIG. 3. However, other structural and operational embodiments will apparent to persons skilled in the relevant art(s) based on the following discussion.

Figure 4:
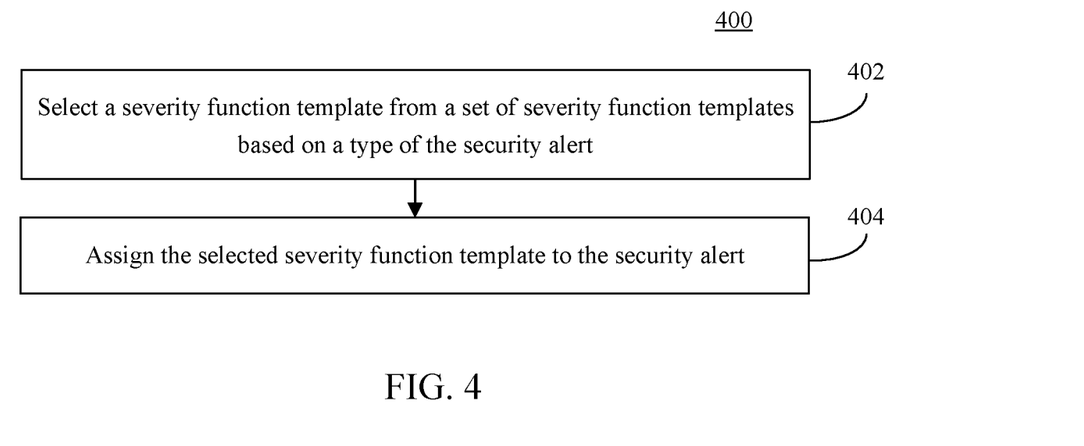
FIG. 4 is a flowchart of a method of assigning a severity function template to a security alert, according to an example embodiment.

For example, FIG. 4 depicts a flowchart 400 of a method of assigning a severity function template to a security alert, according to an example embodiment. At step 402, a severity function template is selected from a set of severity function templates based on a type of the security alert. For example, and with reference to adaptive severity system 300 of FIG. 3, severity modifier 308, as discussed above, may select a severity function template from a set of severity function templates based on a type of the security alert. For example, severity modifier 308 may select from multiple severity function templates based on a type of the security alert, and the type may be based on the analytics used to generate the security alert, such as virtual machine behavioral analysis, network analysis, and database and data warehouse analysis. Other types, factors and criteria may be used to select the severity function template. For example, a generic severity function template for all alerts may be selected for all alert types. As another example, multiple severity function templates, each corresponding to an alert type, may be generated and selected by severity modifier 308. A new severity function template may be generated by modifying an old severity function template, for example. In an example embodiment, the generation and/or selection of the severity function template may be performed by a security system, such as security system 116 of FIG. 1, at the time of generation of a security alert.

Flowchart 400 continues with step 404. At step 404, the selected severity function template is assigned to the security alert. For example, severity modifier 308 shown in FIG. 3 may assign the selected severity function template to a security alert, such as security alert 312. In another example, security system 116 shown in FIG. 1, may assign the severity function template to security alert 312 at the time of its issuance, and may save the selected severity function template along with security alert 312 in a repository. According to this example, when security alert 312 is received by adaptive severity system 300, security alert 312 may already include an assigned severity function template.

Figure 5:
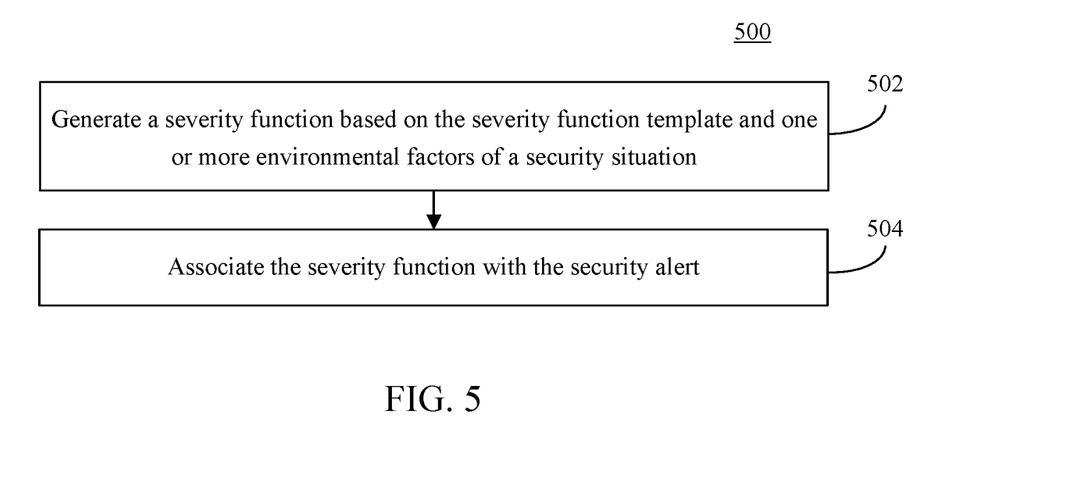
FIG. 5 is a flowchart of a method of generating a severity function for a security alert, according to an example embodiment.

The process of adapting a severity of a security alert is further described in connection with FIG. 5. FIG. 5 depicts a flowchart 500 of a method of generating a severity function for a security alert, according to an example embodiment. At step 502, a severity function based on the severity function template and one or more environmental factors of a security situation is generated. For example, severity modifier 308 of FIG. 3 may be configured to generate a severity function based on the severity function template and one or more environmental factors 316 related to a security situation and to associate the severity function with security alert 312. The security situation may be, for example, a specific security incident, an event, or a global security situation.

At step 504, the severity function is associated with the security alert. For example, severity determiner 308 may associate a severity function with a security alert, such as security alert 312 as shown in FIG. 3.

Figure 6:
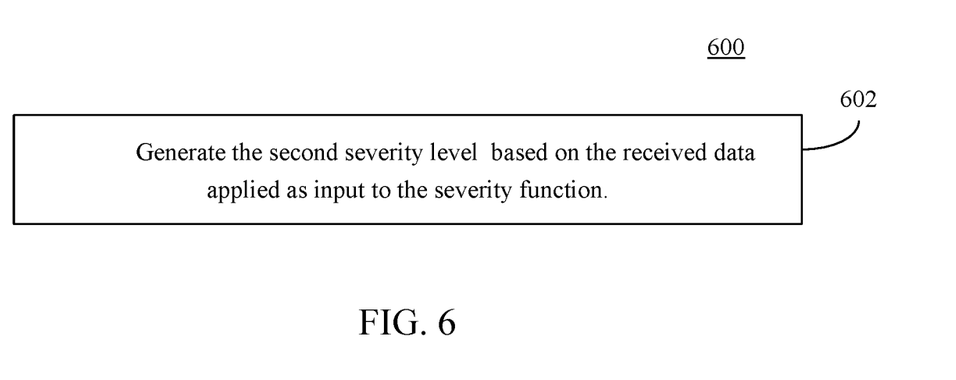
FIG. 6 is a flowchart of a method of updating a severity level for a security alert, according to an example embodiment.

The process of adapting a severity of a security alert is further described in connection with FIG. 6. FIG. 6 depicts a flowchart 600 of a method of updating a severity level for a security alert, according to an example embodiment. At step 602, the second severity level based on the received data applied as input to the severity function is generated. For example, in reference to FIG. 3, severity determiner 308 may generate the second severity level based on the received data applied as input to the severity function. As discussed above, severity determiner 308 may apply environmental factors 316 to a function trained by machine learning algorithm 318 to generate a modified severity for security alert 312. When security alert 312 has no assigned severity function template, severity determiner 308 may modify the default severity of security alert 312 based on system or user configurable rules or one or more triggering events, such as a new alert being generated, information about the security alert, or a time factor.

Figure 7:
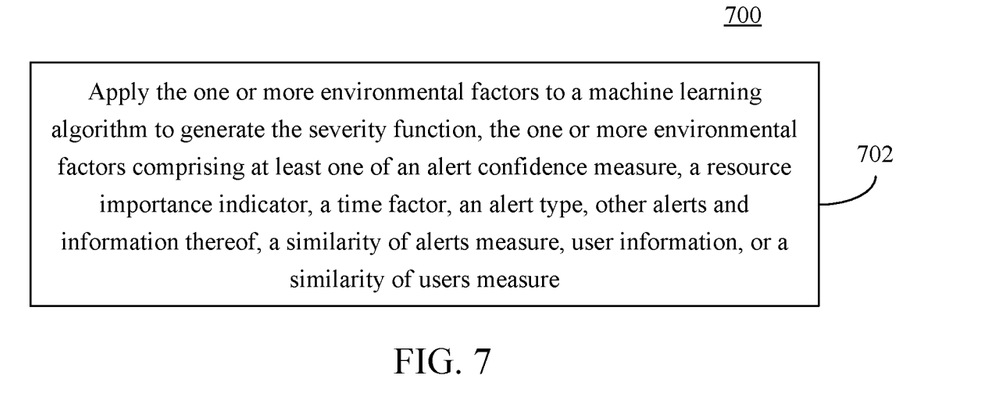
FIG. 7 is a flowchart of another method of generating a severity function for a security alert via machine learning, according to an example embodiment.

The process of adapting a severity of a security alert is further described in connection with FIG. 7. FIG. 7 depicts a flowchart 700 of a method of generating a severity function via machine learning, according to an example embodiment. At step 702, one or more environmental factors is applied to a machine learning algorithm to generate the severity function, the one or more environmental factors comprising at least one of an alert confidence measure, a resource importance indicator, a time factor, an alert type, other alerts and information thereof, a similarly of alerts measure, user information, or a similarity of users measure. For example, severity determiner 308 of FIG. 3 may employ machine learning algorithm 318 to train a severity function with environmental factors and other information. Additionally or alternatively, machine learning algorithm 318 may train a severity function with other information such as system on chip inputs, user feedback on true positive/false positive from one or more user; security trends, posts, blogs, new vulnerabilities and other findings in media, time and likelihood for other correlated alerts to be issued after a given security alert is generated; best practices and known security rules (e.g., password expiration time), etc. While machine learning is described with respect to step 702, machine learning may be used in other steps described herein, for example, any of the steps of flowchart 200 and extensions thereof.

Figure 8:
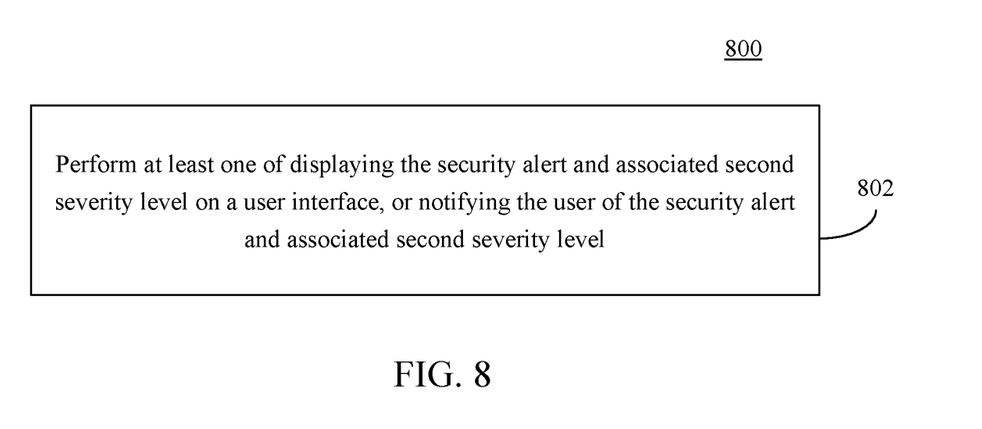
FIG. 8 is a flowchart of a method for providing a security alert with an updated severity level to a user, according to an example embodiment.

The process of adapting a severity of a security alert is further described in connection with FIG. 8. FIG. 8 depicts a flowchart 800 of a method of providing a security alert with an updated severity level to a user, according to an example embodiment. At step 802, at least one displaying the security alert and associated second severity level on a user interface, or notifying the user of the security alert and associated second severity level is performed. For example, alert manager 310 shown in FIG. 3 may be configured to manage security alert 312 by assembling and/or generating a notification 322 that may include at least security alert 312 and its updated severity level. Notification 322 may be provided to a user through one or more means, such as displaying notification 322 on an application or a user interface, such as user interface 114 shown in FIG. 1. For example, notification 322 may be displayed on a web UI of a security product such that the user may view notification 322 the next time the user logs into the security product. Notification 322 may additionally or optionally be sent to the user directly, such as via email, telephone—as a voice call or a text message, or an instant messaging platform. In example embodiments, notification 322 may be provided to the user via one or more API calls.

Figure 9:
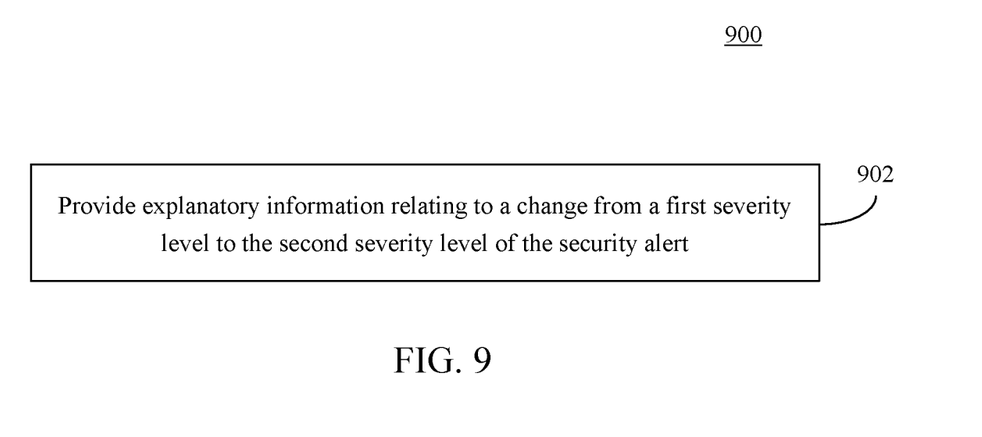
FIG. 9 is a flowchart of a method for providing explanatory information for a severity level change, according to an example embodiment.

The process of adapting a severity of a security alert is further described in connection with FIG. 9. FIG. 9 depicts a flowchart 900 of a method for providing explanatory information for a severity level change, according to an example embodiment. At step 902, explanatory information relating to a change from a first severity level to the second severity level of the security alert is provided. For example, alert manager 310 shown in FIG. 3 may be configured to include contextual information or explanatory information relating to the change from the default severity level to the modified severity level of security alert 312 in notification 322. The additional information may be received from severity modifier 308 and/or generated by alert manager 310.

III. Example Computer System Implementation

Each of computing devices 104A-104N, servers 112A-112N, and adaptive severity system 300, and flowcharts 200 and 400-900 may be implemented in hardware, or hardware combined with one or both of software and/or firmware. For example, computing devices 104A-104N, servers 112A-112N, and adaptive severity system 300, and flowcharts 200 and 400-900 may be implemented as computer program code/instructions configured to be executed in one or more processors and stored in a computer readable storage medium. Alternatively, computing devices 104A-104N, servers 112A-112N, and adaptive severity system 300, and flowcharts 200 and 400-900 may be implemented as hardware logic/electrical circuitry.

For instance, in an embodiment, one or more, in any combination, of computing devices 104A-104N, servers 112A-112N, and adaptive severity system 300, and flowcharts 200 and 400-900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
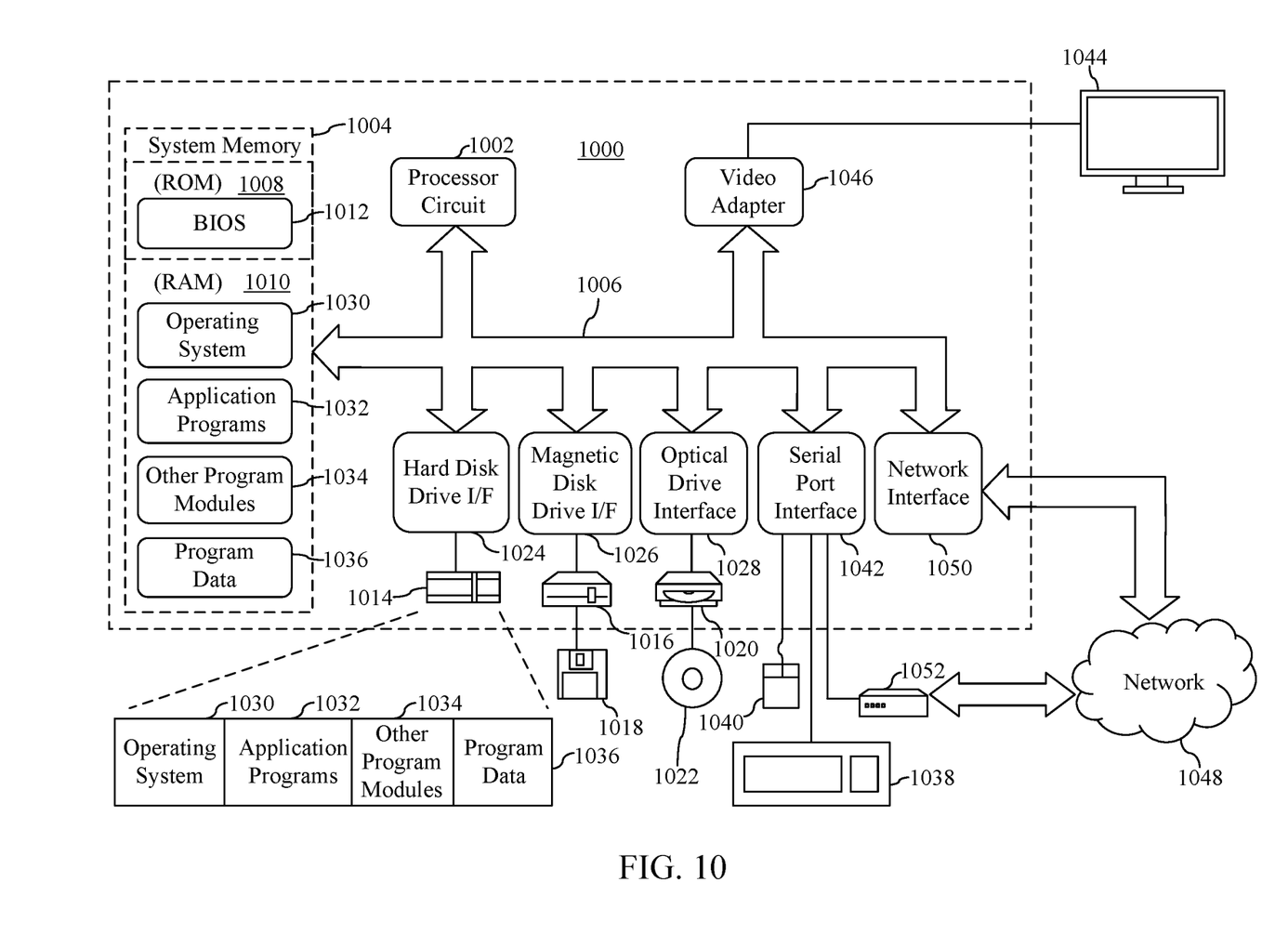
FIG. 10 is a block diagram of an example computer system in which embodiments may be implemented.

FIG. 10 depicts an exemplary implementation of a computing device 1000 in which embodiments may be implemented. For example, computing devices 104A-104N, servers 112A-112N, and adaptive severity system 300 may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing computing devices 104A-104N, servers 112A-112N, and adaptive severity system 300, and flowcharts 200 and 400-900 (including any suitable step of flowcharts 200 and 400-900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments described herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method comprises receiving a security alert associated with an entity; determining a first severity level associated with the security alert; receiving data indicative of at least one environmental factor; generating, based at least on the received data, a second severity level associated with the security alert; and providing the security alert and associated second severity level to a user associated with the entity.

In one embodiment of the foregoing method, the entity comprises at least one of a user machine, a virtual machine, a network, an application, or data.

In an embodiment, the method further comprises selecting a severity function template from a set of severity function templates based on a type of the security alert; and assigning the selected severity function template to the security alert.

In another embodiment, the method further comprises generating a severity function based on the severity function template and one or more environmental factors related to a security situation; and associating the severity function with the security alert.

In yet another embodiment of the foregoing method, said generating, based at least one the received data, a second severity level associated with the security alert comprises generating the second severity level based on the received data applied as input to the severity function.

In still another embodiment of the foregoing method, said generating a severity function based on the severity function template comprises applying the one or more environmental factors to a machine learning algorithm to generate the severity function, the one or more environmental factors comprising at least one of an alert confidence measure, a resource importance indicator, a time factor, an alert type, other alerts and information thereof, a similarity of alerts measure, user information, or a similarity of users measure.

In an embodiment of the foregoing method, said providing the security alert and associated second severity level to the user comprises at least one displaying the security alert and associated second severity level on a user interface; or notifying the user of the security alert and associated second severity level.

In another embodiment of the foregoing method, said providing the security alert and associated second severity level to the user further comprises providing explanatory information relating to a change from the first severity level to the second severity level of the security alert.

A system is described herein. In one embodiment, the system comprises: one or more processing circuits; and one or more memory devices storing program code that are executable by the one or more processing circuits, the program code comprising a severity determiner configured to receive a security alert associated with an entity, and determine a first severity level associated with the security alert; a severity modifier configured to receive data indicative of at least one environmental factor, and generate, based at least on the received data, a second severity level associated with the security alert; and an alert manager configured to provide the security alert and associated second severity level to a user associated with the entity.

In one embodiment of the foregoing system, the entity comprises at least one of a user machine, a virtual machine, a network, an application, or data.

In another embodiment of the foregoing system, the severity modifier is further configured to select a severity function template from a set of severity function templates based on a type of the security alert; and assign the selected severity function template to the security alert.

In yet another embodiment of the foregoing system, the severity modifier is further configured to generate a severity function based on the severity function template and one or more environmental factors related to a security situation; and associate the severity function with the security alert.

In still another embodiment of the foregoing system, the severity modifier is further configured to generate the second severity level based on the received data applied as input to the severity function.

In yet another embodiment of the foregoing system, the severity modifier is further configured to apply the one or more environmental factors to a machine learning algorithm to generate the severity function, the one or more environmental factors comprising at least one of an alert confidence measure, a resource importance indicator, a time factor, an alert type, other alerts and information thereof, a similarity of alerts measure, user information, or a similarity of users measure.

In an embodiment of the foregoing system, the alert manager is further configured to provide the security alert and associated second severity level to the user by at least one of displaying the security alert and associated second severity level on a user interface; or notifying the user of the security alert and associated second severity level.

In yet another embodiment of the foregoing system, the alert manager is further configured to provide explanatory information relating to a change from the first severity level to the second severity level.

A computer-readable memory device having program instructions recorded thereon that, when executed by at least one processing circuit, perform a method on a computing device for determining a severity level of a security alert. In one embodiment of the computer-readable memory device, the method comprises receiving a security alert associated with an entity; determining a first severity level associated with the security alert; receiving data indicative of at least one environmental factor; generating, based at least on the received data, a second severity level associated with the security alert; and providing the security alert and associated second severity level to a user associated with the entity.

In an embodiment of the foregoing computer-readable memory device, the method further comprises selecting a severity function template from a set of severity function templates based on a type of security alert; and assigning the selected severity function template to the security alert.

In another embodiment of the foregoing computer-readable memory device, the method further comprises generating a severity function based on the severity function template and one or more environmental factors related to a security situation; and associating the severity function with the security alert.

In yet another embodiment of the foregoing computer-readable memory device, the method further comprises generating the second severity level based on the received data applied as input to the severity function.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A computer-implemented method, comprising:
receiving, by a severity system server, a security alert associated with an entity;
determining, by the severity system server, a first severity level associated with the received security alert;
receiving, by the severity system server, data indicative of at least one environmental factor, comprising data relating to at least one factor that influences a severity of a security alert;
in response to a determination that the at least one environmental factor has an influence on a severity of the received security alert and prior to presenting the received security alert to a user associated with the entity, generating, by the severity system server and based at least on the received data, a second severity level associated with the received security alert that is different from the first severity level; and
transmitting the received security alert and associated second severity level to a computing device associated with the user associated with the entity.

2. The method of claim 1, further comprising:
updating the second severity level to a third severity level for the received security alert based at least on a time factor.

3. The method of claim 1, further comprising:
selecting a severity function template from a set of severity function templates based on a type of the received security alert; and
assigning the selected severity function template to the received security alert.

4. The method of claim 3, further comprising:
generating a severity function based on the severity function template and one or more environmental factors related to a security situation; and
associating the severity function with the received security alert.

5. The method of claim 4, wherein said generating, based at least on the received data, a second severity level associated with the received security alert comprises:
generating the second severity level based on the received data applied as input to the severity function.

6. The method of claim 5, wherein said generating a severity function based on the severity function template comprises:
applying the one or more environmental factors to a machine learning algorithm to generate the severity function, the one or more environmental factors comprising at least one of an alert confidence measure, a resource importance indicator, a time factor, an alert type, other alerts and information thereof, a similarity of alerts measure, user information, or a similarity of users measure.

7. The method of claim 1, wherein said transmitting the received security alert and associated second severity level to the computing device associated with the user further comprises:
transmitting explanatory information relating to a change from the first severity level to the second severity level of the received security alert.

8. A severity system server, comprising:
one or more processing circuits; and
one or more memory devices connected to the one or more processing circuits, the one or more memory devices storing program code that are executable by the one or more processing circuits, the program code comprising:
a severity determiner that
receives a security alert associated with an entity, and
determines a first severity level associated with the received security alert;
a severity modifier that
receives data indicative of at least one environmental factor, comprising data relating to at least one factor that influences a severity of a security alert, the at least one factor including a number of other alerts that are correlated with the entity or the security alert, and
in response to a determination that the at least one environmental factor has an influence on a severity of the received security alert:
selects a severity function template based on the received security alert,
assigns the selected severity function template to the received security alert,
generates a severity function based on the selected severity function template,
generates a second severity level associated with the received security alert that is different from the first severity level by applying the received data as input to the generated severity function; and
an alert manager that transmits the received security alert and associated second severity level to a computing device associated with a user associated with the entity.

9. The severity system server of claim 8, wherein the severity modifier further:
updates the second severity level to a third severity level for the received security alert based at least on a time factor.

10. The severity system server of claim 8, wherein the severity modifier:
selects the severity function template from a set of severity function templates based on a type of the received security alert.

11. The severity system server of claim 10, wherein the severity modifier further:
generates the severity function based on the selected severity function template and one or more environmental factors related to a security situation; and
associates the generated severity function with the received security alert.

12. The severity system server of claim 11, wherein the severity modifier further applies the one or more environmental factors to a machine learning algorithm to generate the severity function.

13. The severity system server of claim 8, wherein the alert manager further transmits explanatory information relating to a change from the first severity level to the second severity level of the received security alert.

14. A computer-readable memory device having program instructions recorded thereon that, when executed by at least one processing circuit of a severity system server, perform a method by the severity system server for determining a severity level of a security alert, the method comprising:
receiving a security alert associated with an entity;
determining a first severity level associated with the received security alert;
monitoring the received security alert for a triggering event that relates to at least one factor that influences a severity of a security alert, the triggering event comprising a passage of time;
detecting the triggering event by detecting the passage of time;
in response to detecting the triggering event, and prior to presenting the received security alert to a user associated with the entity generating, based at least on the triggering event, a second severity level associated with the received security alert that is different from the first severity level; and
transmitting the received security alert and associated second severity level to a computing device associated with a user associated with the entity.

15. The computer-readable storage memory device of claim 14, wherein the method further comprises:
selecting a severity function template from a set of severity function templates based on a type of the received security alert; and
assigning the selected severity function template to the received security alert.

16. The computer-readable storage memory device of claim 15, wherein the method further comprises:
generating a severity function based on the severity function template and one or more environmental factors related to a security situation; and
associating the severity function with the received security alert.

17. The computer-readable storage memory device of claim 16, wherein
said detecting the triggering event comprises receiving data indicative of the triggering event; and
the method further comprises:
generating the second severity level based on the received data applied as input to the severity function.

18. The severity system server of claim 12, wherein the one or more environmental factors further comprises at least one of an alert confidence measure, a resource importance indicator, a time factor, an alert type, other alerts and information thereof, user information, or a similarity of users measure.

19. The computer-readable storage memory device of claim 14, wherein the triggering event further comprises the reception of information about the security alert.

20. The computer-readable storage memory device of claim 14, wherein said transmitting the received security alert and associated second severity level to the computing device associated with the user further comprises:
presenting explanatory information relating to a change from the first severity level to the second severity level of the received security alert.

* * * * *